Nov. 9, 1954     C. V. OSBORNE     2,693,700
PRESSURE ASCERTAINING MEANS
Filed March 26, 1954
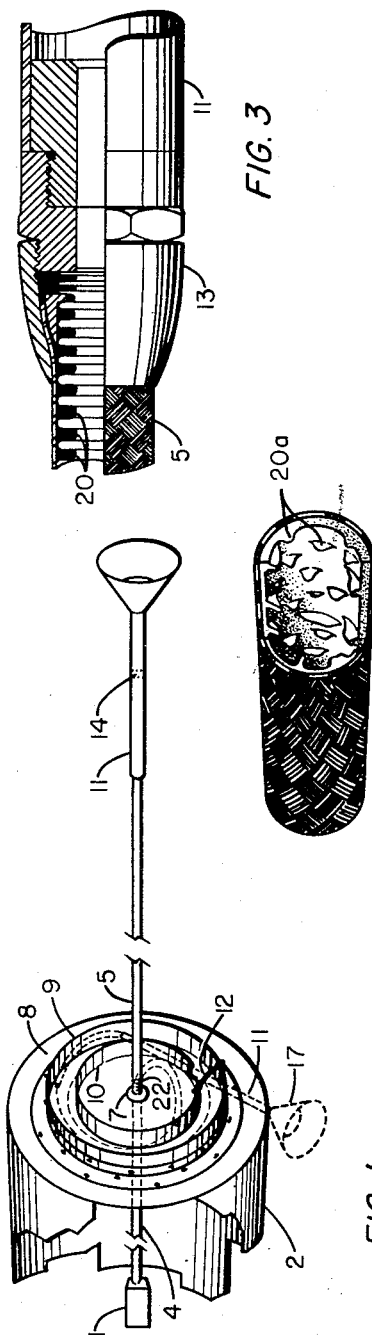
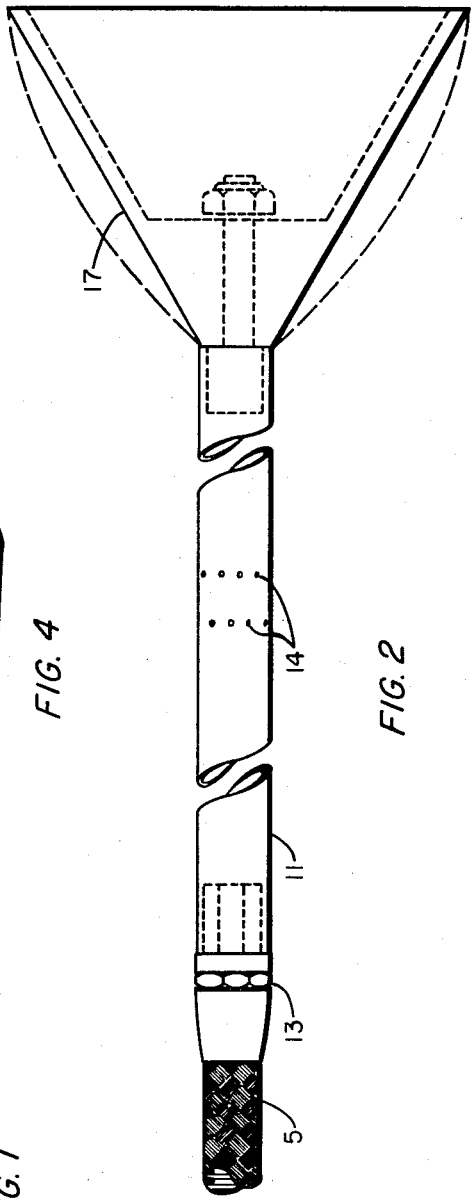
INVENTOR.
CARROL V. OSBORNE
BY
ATTORNEY

United States Patent Office 2,693,700
Patented Nov. 9, 1954

2,693,700

PRESSURE ASCERTAINING MEANS

Carrol V. Osborne, Albuquerque, N. Mex., assignor, by mesne assignments, to the United States of America as represented by the United States Atomic Energy Commission Application March 26, 1954, Serial No. 419,122

16 Claims. (Cl. 73—182)

The present invention relates generally to means for ascertaining static gas pressures extant adjacent a body moving through the gas or over which a gas stream is passing, and more particularly to means adapted to furnish pressure responsive apparatus with accurate indications of static gas pressures extant adjacent the body.

In attempting to design and to evaluate the flight performance of bodies such as aircraft, missiles, wind tunnel models, et cetera, it is essential to ascertain as accurately as possible the static gas or air pressure existing adjacent the body. This is difficult to ascertain due to the fact that relative motion between the body and the gas gives rise to flow patterns and eddies or turbulent conditions that set up multiple positive or negative pressure zones, where the pressures are either greater or lesser than the static or ambient pressure which must be determined; ascertaining the pressure at such positive or negative zones is misleading as it does not give the desired true picture for proper performance evaluations. As the relative speed of the body approaches or exceeds the Mach number of unity corruption of gas stream flow and shock waves render accurate ascertainment of ambient static pressure even more difficult.

Attempts have been made to determine the ambient pressure by mounting a forwardly projecting probe on the body, but this expedient has been unsatisfactory as the pressure is corrupted by gas or air flow adjacent the body; the corruption is a maximum when the Mach number of the body approaches unity, which is frequently the very speed zone at which accurate pressure indications are most desired.

The present invention aims to overcome the aforementioned and other difficulties or disadvantages by providing new and improved means for ascertaining the static gas pressure extant a body which does not interfere in any way with flow of gas over the body. The invention further contemplates the provision of new and improved means adapted to stream out behind the body and furnish pressure responsive means with accurate indications of static pressure extant adjacent the body.

An object of the present invention is to provide new and improved pressure determining means.

Another object of the invention is to provide new and improved means adapted to accurately indicate the pressure of gas through which a body is passing and to minimize or obviate disturbance of gas flow around the body.

Another object of the invention is to provide new and improved air pressure sensing means adapted to trail behind a body around which a gas is flowing.

A further object of the invention is to provide improved means for communicating ambient gas pressure to pressure responsive means carried by a body.

A still further object of the invention is to provide a new and improved gas pressure sensing means which is subject to minimum vibration or oscillation during usage.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawings,

Fig. 1 is a perspective view showing a preferred embodiment of the present invention, the device being indicated in its extended or operation position by solid lines and in a folded position by dot-dash lines;

Fig. 2 is a side elevational view, on larger scale than that of Fig. 1, showing features of the pressure sensing trailing means illustrated in Fig. 1;

Fig. 3 is an enlarged fragmentary view, partially broken away, showing portions of the flexible tube, the rigid tube element, and their interconnecting means; and Fig. 4 is a fragmentary sectional view showing another form of flexible tube that may be employed.

As shown, the present device comprises pressure responsive apparatus 1 adapted to be carried by a body 2, a conduit 4 connecting the pressure responsive apparatus 1 with a length of internally roughened or corrugated flexible tubing 5 through the intermediation of a coupling 7 carried by and extending through a wall or bulkhead 8 of the body 2, rigid tubular means 11 connected and in communication with the corrugated flexible tubing 5 by coupling means 13 and provided intermediate its ends with pressure-communicating apertures 14, and a generally conical "drag cone" member 17 secured to the rigid tubular means 11 adjacent a closed terminal end thereof.

When not in pressure ascertaining operation, the length of flexible tubing 5 may be coiled in a channel formed by circumferentially spaced retaining walls 9 and 10 carried by the bulkhead 8. The rigid tube 11 may seat in recesses of the walls 9 and 10 and be maintained in position by a removable clip or latch 12. This coiled relationship is indicated by the dot-dash lines in Fig. 1. When the retaining clip 12 is removed, for example, by a pullout wire (not shown), the device streams or trails behind the body 2 in the relationship indicated by solid lines in Fig. 1.

The pressure responsive apparatus, of any suitable type responsive to gas pressure variations impressed upon it, communicates with the flexible tube means 5 through an internal tube 4 that is preferably sufficiently rigid to maintain conducting shape regardless of pressure existing in the volume which surrounds it.

When the body 2 is moving through air, pressure indications pass through the sensing apertures 14 of rigid tube 11 and through this tube into flexible tube 5, through the latter and its coupling 7 to the interior tube 4 and thence to the pressure responsive apparatus 1. The interior of the flexible tube 5 is shown in Figs. 3 and 4 comprising a member having inwardly projecting protuberances 20a or circumferentially extending corrugations 20, preferably disposed along substantially the entire length thereof. While the corrugations are indicated in Fig. 3 as spaced from each other lengthwise of the flexible tube 5, they may be portions of a continuous spiral.

The exterior of the flexible tube means 5 is preferably enclosed by a woven wire braid or armor so that it is flexible but not unduly limp; in addition to providing flexibility, the exterior braid or armor serves to carry the load during flight and prevent undesirable elongation of the interior member. The combination of exterior braid or armor and separate interior member provides a construction which has a stiffness that tends to maintain the flexible tube generally straight rather than to let it droop or kink as would be true, for example, with a length of soft rubber tubing. A bend-resisting spring 22 may encircle the flexible tubing 5 adjacent the location where it emerges from coupling means 7 to minimize the possibility of an abrupt kink or bend at this location and assist in urging the flexible tubing toward the elongated relationship indicated by the solid lines of Fig. 1.

The rigid hollow tube 11, which may connect with the flexible tube 5 by appropriate coupling means such as that indicated in Fig. 3, has the apertures 14 penetrating its wall in generally radial fashion so that the sides of the apertures are disposed at approximately 90 degrees to the outer surface of the tube 11. These apertures are preferably not countersunk in any way and any burrs which may occur during their formation are removed. The approximately radial disposition of the apertures 14 is highly desirable as it minimizes a tendency to "ram" air or other gas into the tube which may occur if the axes of the apertures are inclined forwardly or a tendency to suck air out of the tube which may occur if the apertures axes are inclined rearwardly. The sharply defined exterior edges of the apertures and absence of burrs obviates or minimizes interference with gas flow along the device.

The combination of rigid tube 4 with the flexible tube 5 and its inwardly extending projections, corrugations or serrations gives remarkably accurate and superior results in ascertaining the true static pressures. While not certain of the theory of operation, it is believed that the rough interior surface of the flexible tube acts upon the gas in the flexible tube, and upon any gas pulses or puffs, to "smooth out" the gas so that the pressure at the inner or attached end of the flexible tube 5 is devoid of pulses and maintained at smooth or steady values that correspond to the static gas pressure adjacent the body 2. It is probable that the gas is subjected to a series of compressions and expansions along the flexible tube length, the net result of which is to bring about existence of the true static pressure adjacent the forward end of the flexible tube.

Highly superior and remarkably accurate pressure indication results have been achieved with the above combination by utilizing a flexible tube 5 of length about three times the diameter of the body 2, together with a rigid tubular member 11 of diameter about the same as that of the flexible tube 5 and length to facilitate locating the sensing apertures 14 at least twelve times the diameter of the rigid tubular member from its open front end and about eighteen times the diameter thereof from the point where exterior surfaces of rigid member and conical member merge, and a drag cone 17 of about 60 degrees included angle and base diameter about seven times that of the rigid tube 11 to which it is secured. Here again the exact reason why these relative proportions give such excellent results is not clearly understood but it is thought that the pressure sensing apertures 14 may thus be located at such location that they are not objectionably influenced by air flow, shock waves or other phenomena, that there results minimum oscillation or side-to-side swinging of the device, and that the internally roughened flexible tube may act as a sort of muffler to iron out gas pulses or shocks.

With a 60 degree angle on the cone member 17 any shock waves that may form and most likely to occur at the base of the cone and where the cone joins the rigid tubular member 11, where they seem to give little or no objectionable interference with pressure sensing. The exterior periphery of the member 17 may be of gentle curvature as indicated generally by the dotted lines in Fig. 2, but curvature appreciably in excess of such is not desired as the locations of shock waves which may form are then uncertain and unpredictable.

The radial apertures 14 are preferably of diameter about three-thirty seconds to one-eighth of an inch, as it is found that such avoids faulty pressure indications which seem to be inherent with large apertures or slots and minimizes or prevents plugging of the apertures with ice under certain atmospheric conditions. Excellent results may be obtained by arranging the apertures in rows around the rigid tube 11, for example, two rows about one-half inch apart with individual apertures of the rows offset or staggered with respect to each other as shown more particularly in Fig. 2.

The highly desirable features of minimizing oscillations of the device by utilizing a flexible tube with external metal braid covering and internal member such as in Figs. 3 and 4 have already been discussed. This result is further enhanced by forming the rigid tube 11 and drag cone member 17 of light weight but strong material such as aluminum or resin impregnated fibrous glass cloth, with the cone 17 hollow to further reduce its weight. In addition to minimizing oscillations by reason of minimum inertia, the light weight of tubular member 11 and cone member 17 minimizes opening shock stresses.

It will be seen that the present invention provides a new and improved device adapted to facilitate accurate ascertainment of static gas pressure adjacent a body moving through the air or over which an air stream is flowing. The device is remarkably unaffected by flow patterns, eddies, or other turbulent conditions which may exist adjacent the body and objectionable oscillations which might tend to ram air into the sensing tubes or to suck it therefrom are obviated or minimized regardless of whether relative motion between the body and air is at comparatively low speeds or in the vicinity of Mach number unity or higher. In addition, the device is of relatively simple and rugged construction and well adapted to withstand any rough usage to which it may be subjected.

As various changes may be made in the form, construction and arrangement of the parts herein without sacrificing any of its advantages, it is understood that all matter herein is to be interpreted as illustrative and not in a limiting sense.

I claim:

1. A device adapted to impart to pressure responsive apparatus carried by a body the ambient pressure adjacent the body comprising flexible tubular means in communication with said apparatus and in trailing relationship with respect to said body during pressure ascertainment periods having an inner surface provided with a plurality of inwardly directed protuberances, rigid tubular means secured to and having an open end in communication with said flexible tubular means and having an opposite closed end and provided intermediate said open and closed ends with a plurality of penetrating apertures, and a generally conical member secured adjacent its apex to said rigid tubular means adjacent its closed end.

2. A device as claimed in claim 1 wherein said rigid tubular means is provided with a smooth interior surface.

3. A device as claimed in claim 1 in which the flexible tubular means has a length about three times the diameter of said body.

4. A device as claimed in claim 1 in which the flexible tubular means is connected with the pressure responsive apparatus by second rigid tubular means.

5. A device as claimed in claim 1 in which said apertures extend generally radially through the wall of said rigid tubular means.

6. A device as claimed in claim 1 in which said apertures are disposed in a plurality of circumferentially disposed rows.

7. A device as claimed in claim 6 in which individual apertures of each row are circumferentially offset with respect to individual apertures of an adjacent row.

8. A device as claimed in claim 1 in which said apertures in the rigid tubular means are spaced at least twelve times the diameter thereof from its open end.

9. A device as claimed in claim 1 in which said apertures are of diameter about three-thirty seconds of an inch to one-eighth of an inch.

10. A device as claimed in claim 1 in which said apertures in the rigid tubular means are spaced about eighteen times the diameter thereof in advance of the location where exterior surfaces of said tubular means and conical member merge.

11. A device as claimed in claim 1 in which the generally conical member has an included angle of about 60 degrees.

12. A device as claimed in claim 1 in which the generally conical member has a base diameter about seven times that of the rigid tubular means to which it is secured.

13. A device as claimed in claim 1 in which said generally conical member is composed of light weight material such as resin-impregnated fibrous glass cloth.

14. A device for imparting to pressure responsive apparatus the static gas pressure adjacent a body comprising flexible tubular means in communication with said apparatus and disposed in trailing relationship with respect to said body during pressure ascertainment periods having a corrugated inner surface, rigid tubular means secured to and having an open end in communication with said flexible tubular means and having an opposite closed end and provided intermediate said open and closed ends with a plurality of penetrating apertures, and a generally conical member secured adjacent its apex to said rigid tubular means adjacent its closed end.

15. A device adapted to impart to pressure responsive apparatus carried by a body the ambient pressure adjacent the body comprising flexible tubular means in communication with said apparatus and in trailing relationship with respect to said body during pressure ascertainment periods including an outer protective layer enclosing a bellows member having an inner exposed surface provided with generally circumferentially extending projecting portions, rigid tubular means secured to and having an open end in communication with the interior of said bellows member and having an opposite closed end and provided intermediate said open and closed ends with a plurality of penetrating apertures, and a generally conical member secured adjacent its apex to said rigid tubular means adjacent its closed end.

16. A device as claimed in claim 15, in which means is carried by said body adjacent a rear end thereof forming a housing for said flexible tubular means, and retaining means is provided to maintain the flexible tubular means in said housing when not in use.

References Cited in the file of this patent

UNITED STATES PATENTS

| Number | Name | Date |
|---|---|---|
| 253,287 | Hogg | Feb. 7, 1882 |
| 2,101,858 | Kinsley | Dec. 14, 1937 |
| 2,318,153 | Gilson | May 4, 1943 |